United States Patent [19]

Vazirani

[11] 3,833,411

[45] Sept. 3, 1974

[54] ARTICLES COATED WITH ALKALI-SOLUBLE POLYESTER-TYPE RESINS AND METHOD OF PRODUCING THEM

[75] Inventor: Hargovind Nihchaldas Vazirani, Stirling, N.J.

[73] Assignee: Bell Telephone Laboratories, Incorporated, Murray Hill, N.J.

[22] Filed: Apr. 5, 1973

[21] Appl. No.: 348,067

Related U.S. Application Data

[63] Continuation-in-part of Ser. No. 190,411, Oct. 18, 1971, abandoned, which is a continuation-in-part of Ser. No. 131,478, April 5, 1971, abandoned.

[52] U.S. Cl............ 117/232, 117/128.4, 117/161 K, 260/22 R, 260/29.2 E, 260/29.2 UA
[51] Int. Cl......... B44d 1/34, B44d 1/42, C09d 3/64
[58] Field of Search ..... 260/22 R, 29.2 E, 29.2 UA; 117/232

[56] References Cited
UNITED STATES PATENTS

| | | | |
|---|---|---|---|
| 2,856,374 | 10/1958 | Bolton | 260/22 |
| 3,066,108 | 11/1962 | Broadhead | 260/22 |
| 3,223,666 | 12/1965 | Bolton | 260/29.2 |
| 3,382,203 | 5/1968 | Rating et al. | 260/33.4 |
| 3,437,618 | 4/1969 | Taft | 260/22 |
| 3,493,414 | 2/1970 | Hastings | 117/41 |

FOREIGN PATENTS OR APPLICATIONS

| | | | |
|---|---|---|---|
| 794,434 | 9/1968 | Canada | 260/29.2 E |

*Primary Examiner*—Donald E. Czaja
*Assistant Examiner*—Ronald W. Griffin
*Attorney, Agent, or Firm*—J. C. Fox and E. B. Cave

[57] ABSTRACT

The alkali-soluble polyester resins described herein contain trimellitic anhydride in the amount of 41 to 44 parts by weight, dipropylene glycol in the amount of 28 to 31 parts by weight, glycerol in the amount of 6.3 to 7.2 parts by weight and castor oil in the amount of 20 to 26 parts by weight of the total composition. In addition, neopentyl glycol may be substituted for dipropylene glycol in amounts up to 16 parts by weight of the total composition, in which case the combined proportion of dipropylene glycol and neopentyl glycol may be reduced to 26.5 parts by weight. The components are proportioned within the ranges stated to give an OH/COOH ratio of from 1.05:1 to 1.15:1. When fully cured, the resins are useful as insulating coatings on wire.

3 Claims, 1 Drawing Figure

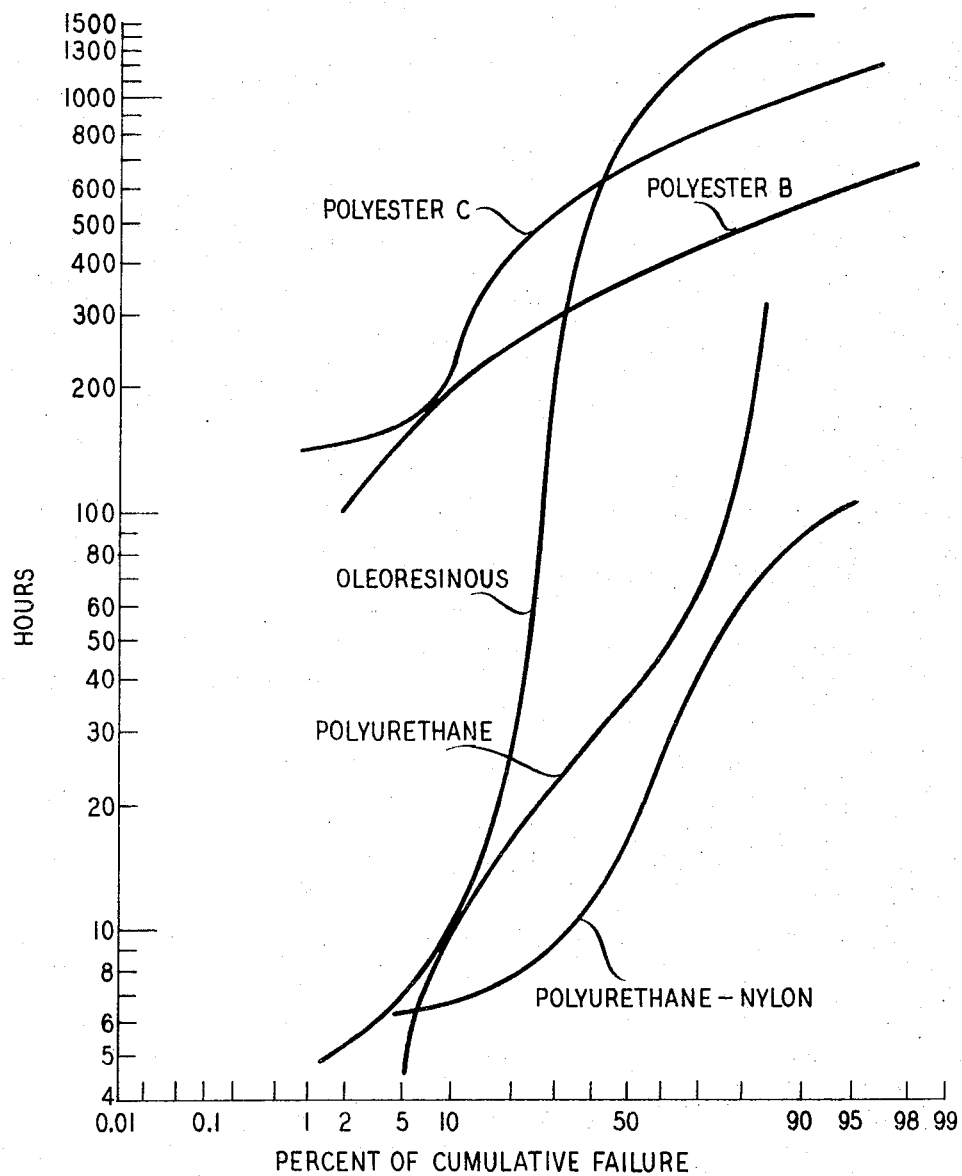

ARTICLES COATED WITH ALKALI-SOLUBLE POLYESTER-TYPE RESINS AND METHOD OF PRODUCING THEM

CROSS REFERENCE TO RELATED APPLICATION

This application is a continuation-in-part of my copending application Ser. No. 190,411, filed Oct. 18, 1971, now abandoned, which was a continuation-in-part of my copending application Ser. No. 131,478, filed Apr. 5, 1971, now abandoned.

BACKGROUND OF THE INVENTION

1. Field of the Invention

This invention relates to articles coated with alkali-soluble polyester-type resins; and more particularly to articles coated with such resins containing trimellitic anhydride, short-chain polyols, and castor oil or its derivatives; and also relates to method of coating articles with these resins.

2. Description of the Prior Art

The requirements of the communications industry for magnet wire for use in coils, transformers, relays, etc., is very large, being of the order of millions of pounds per year. This wire must generally be provided with an insulating coating. Coating formulations in use at the present time include an oleoresinous composition which is made up of about 70 parts of an oil such as castor oil or soya oil and 30 parts Pentalyn-G, the trade name for a commercially available maleic modified pentaerythritol ester of rosin. The composition also contains a drier such as a metal naphthenate to promote curing of the oil, and an antioxidant. Other coating formulations include a commercial polyurethane marketed under the tradename "Varnish 6393" either with or without a nylon cover coat. Coating at production rates is achieved by running the wire over a coating roller partially immersed in a bath of a solution of partially cured resin solids in a mixture of organic solvents, allowing the solvents to evaporate, and curing the resin by heating. Thus, at present large amounts of these solvents are vented directly into the atmosphere. Avoidance of such venting by providing catalytic burners to decompose the solvents would require substantial capital expenditures. Such solvent venting could alternatively be avoided by using a resin formulation whose partially cured state is soluble in aqueous media so that primarily water vapor would be vented to the atmosphere. However, commercially available resins which are soluble in aqueous media are generally not suitable for use as insulative coatings in electrical applications. These resins in general lack one or more of the following desired characteristics: (1) low materials cost, (2) coatability, (3) rapid thermal curing, (4) resistance to thermal aging, (5) resistance to dielectric breakdown, (6) mechanical strength and flexibility, and (7) compatibility with existing manufacturing facilities and procedures.

Development efforts have been and continue to be directed to finding a suitable water-soluble resin composition for use as an electrical insulating coating.

SUMMARY OF THE INVENTION

Alkali-soluble polyester-type resins have been developed which exhibit excellent characteristics as coating compositions, and particularly as electrical insulating coatings for wire. The resins are composed of trimellitic anhydride, castor oil, one or more short-chain diols including at least 50 parts by weight of dipropylene glycol, and glycerol. The components are present in amounts sufficient to bring the total ratio of functional hydroxyl groups (including those of castor oil as well as those of the short-chain diols and glycerol) to acid groups (OH/COOH ratio) to from 1.05:1 to 1.15:1. Up to 50 parts by weight of dipropylene glycol may be replaced by neopentyl glycol.

The resins are heat curable to a molecular weight of about 5,000 to 10,000 and are soluble in alkaline aqueous media in the partially reacted state. When coated on wire, they exhibit good coatability and rapid thermal curing, and in the cured state exhibit resistance to thermal aging, abrasion resistance and mechanical flexibility. Wires coated with these compositions, both in the partially reacted and cured state thus form a part of the invention.

BRIEF DESCRIPTION OF THE DRAWING

The FIGURE is a graph of percent cumulative failure versus time in hours showing the thermal aging characteristics of coils of wire coated with two compositions of the resin of the invention and with three different coatings of the prior art.

DETAILED DESCRIPTION OF THE INVENTION

Trimellitic anhydride is present in the resin in the amount of 41 to 44 parts by weight of the resin, below which the final cured state exhibits poor abrasion resistance as a wire coating, and above which the cured resin exhibits poor flexibility as a wire coating. Based upon such considerations, from 42 to 43 parts by weight are preferred for an optimum balance between flexibility and abrasion resistance of the cured resin as a wire coating.

Castor oil when present in the amount of from 20 to 26 parts by weight of the total weight of the resin introduces long aliphatic chains into the backbone of the polyester resulting in reduced cratering in the partially cured resin, and improved mechanical flexibility of the fully cured resin. Cratering is the formation of indentations or craters in the surface of the resin during cure caused by the presence of dust particles or other contaminants. It is preferred for the above purposes to add this compound in the amount of 22 to 24 parts by weight of the total weight of the resin.

The short-chain diols should be present in the amount of 28 to 31 parts by weight, below which the molecular weight would be too high to enable complete reaction during curing, leading to an excessive residual acid value and consequent corrosiveness and above which the molecular weight would be too low, resulting in inadequate abrasion resistance and thermal aging characteristics. Based upon these considerations, from 29 to 30 parts by weight of these diols is preferred. At least 50 weight percent of these diols should be dipropylene glycol. To further improve thermal aging characteristics, neopentyl glycol may be substituted for dipropylene glycol in amounts up to about 50 weight percent, or up to about 16 parts by weight of the resin, above which processing difficulties may be encountered due to the higher viscosity for a given acid value and higher solids content than for compositions without neopentyl glycol. For optimum thermal aging and processing characteristics, it is preferred to limit the substitution to up to 12 parts by weight of the resin although as little as a few parts by weight leads to a noticeable improvement in thermal aging characteristics. When dipropylene glycol is thus partially replaced by neopentyl glycol, a smaller combined proportion of these short chain diols may be used, such as 26.5 parts by weight as in Composition No. 12 in Table 1 below. The compositions also include glycerol, generally in an amount of from 6.3 to 7.2 parts by weight, in order to enhance hardness of the cured resin, below which abrasion resistance of the cured resin is too low, and above which the cured resin has insufficient flexibility for wire coating purposes. In addition, too much glycerol increases viscosity for a given acid value of the partially cured resin, making coating operations difficult. Maintaining glycerol within the range of 6.6 to 6.9 parts by weight is preferred in that it results in adequate hardening without undue viscosity increase.

It is essential for the achievement of the desired molecular weight of the cured resin that the ratio of the total functional hydroxyl groups contributed by the shortchain diols, glycerol and castor oil to the total acid groups (OH/COOH) be within the range of 1.05:1 to 1.15:1. Below this range, the molecular weight would be too high to enable complete reaction during curing, leading to excessive residual acid value and consequent corrosiveness, and above which range the molecular weight would be too low, resulting in insufficient thermal aging characteristics, and abrasion resistance of the cured resin. It should be noted that maintaining the OH/COOH ratio within the specified range will restrict the compositions to less than all possible combinations within the parts by weight ranges already specified. However, observing both the OH/COOH and parts by weight ratios will result in resin compositions having the required coating characteristics.

The terms "partially reacted resin" and "cured resin" are used herein. The term "partially reacted resin" is meant to refer to a state which stops short of bringing the resin to its gel point. Gel point is a term well known in the art and may readily be found by routine experimentation. In the case where the resin is to be used as a wire coating, it is preferred to bring the partial reaction as close to the gel point as practicable in order to minimize the time required for the cure. In the case of the resins of the invention, titrating to an acid value of about 120 to 150 would indicate optimum progression of the partial reaction.

Typically, the partially reacted resin may be obtained by heating the constituents at a temperature of from 170° to 200° C, below which the reaction rate would be too slow to be commercially acceptable, and above which the rate would be too fast to enable control to the desired end point.

Solubility of the partially reacted resin in alkaline aqueous media, as determined by solution viscosity, increases with increasing pH and is optimum when sufficient alkali has been added to result in a pH of 9. Below a pH of 4, solubility is insufficient, resulting in too viscous a solution.

The alkali used should have sufficient volatility to be subject to removal during curing. Suitable alkalies are ammonia and low molecular weight amines, but ammonia is preferred for its economy and volatility. Where ammonia is used, it is ordinarily preferred to adjust the pH of the partially reacted resin solution to about 6.8 ± 0.2 in order to avoid the discharge of excess ammonia gas prior to and during the coating operation.

Viscosity of the partially reacted resin may be adjusted simply by varying the water content of the resin. In general, viscosities within the range of 20 to 30 centipoises will result in suitable wire coating characteristics. Slight shifts in pH due to variations in water content may be compensated by addition of dilute acid or base.

The term "cured resin" means a resin in which the acid value has been brought to as near zero as practical. Curing is generally carried out by heating at between 350° and 600° C. The resins described will ordinarily have molecular weights within the range of 5,000 to 10,000 in the cured state.

EXAMPLE 1

Resins having compositions shown in Table 1 were formulated and brought to the partially reacted state by heating at about 180° ± 5°C for about two hours, resulting in acid values shown in Table 1. When the resin temperatures reached 100°C during cooling, the amounts of ammonia required to neutralize the resins were calculated, and added as 5 percent solutions. The neutralized solutions were then diluted with water to achieve a viscosity of 30 ± 5 centipoises and the pH of the solutions were adjusted to 6.8 ± 0.2. Each resin composition was then coated onto 40 gauge magnet wire by applying and curing five coats of resin on the wire. This was achieved by running the wire between a pair of resin soaked felt pads, and through five 8 foot long tubes having 5 foot hot zones at about 200 feet per minute ± 20 feet per minute at a temperature of about 500°C. This resulted in a final resin coating about 0.2 to 0.3 mils thick.

Table 1

| Comp. No. | TMA | PG | DPG | NPG | G | CO | AV |
|---|---|---|---|---|---|---|---|
| 1 | 43.2 | 13.5 | 26.4 | — | — | 16.9 | 114 |
| 2 | 43.2 | 28.6 | — | — | — | 28.2 | 140 |
| 3 | 44.3 | 26.9 | — | — | — | 28.8 | 117 |
| 4 | 44.3 | 13.9 | 24.5 | — | — | 17.3 | 119 |
| 5 | 44.6 | 14.0 | — | 18.1 | — | 23.3 | 117 |
| 6 | 41.5 | 15.8 | — | — | 6.6 | 36.1 | 120 |
| 7 | 42.0 | — | 29.3 | — | 6.7 | 22.0 | 138 |
| 8 | 42.1 | 25.0 | — | — | — | 32.9 | 120 |
| 9 | 41.9 | 13.1 | 23.2 | — | — | 21.8 | 106 |
| 10 | 42.0 | 13.8 | — | 15.1 | — | 29.1 | 115 |
| 11 | 42.2 | 8.4 | — | 11.4 | 6.8 | 31.2 | 112 |
| 12 | 42.7 | — | 14.9 | 11.6 | 6.8 | 24.0 | 132 |
| 13 | 42.0 | — | 26.9 | — | 6.7 | 24.4 | 149 |
| 14 | 42.0 | 14.6 | — | — | 6.7 | 36.7 | 207 |

TMA — trimellitic anhydride  
DPG — dipropylene glycol  
PG — propylene glycol  
CO — castor oil  
AV — acid value  
G — glycerine  
NPG — neopentyl glycol All coatings were given preliminary thermal aging tests by forming coils with the coated wire, subjecting the coils to varying currents sufficient to cause elevated coil temperatures ranging between 300° and 430°F, and measuring time to failure. Based upon these tests, compositions 6, 7, 12 and 13 were chosen for further testing. Compositions 7 and 12 are compositions of the invention. For each composition, 23 coils were prepared as described above, and subjected to currents sufficient to cause coil temperatures of 360° ± 2°F. Time to failure was observed. The same test was given to coils of wire coated with oleoresinous, polyurethane and polyurethane-nylon compositions discussed above in the Prior Art section. Results are shown in Table II.

Table II

| Compositions | 1st Failure (hours) | Av. Time to failure (hours) | Std. Dev. | $C_v$, % |
|---|---|---|---|---|
| 6 (A) | 1.5 | 140 | 145 | 104 |
| 7 (B) | 91 | 373 | 135 | 36.2 |
| 12 (C) | 167 | 671 | 250 | 37.3 |
| 13 (D) | 1.5 | 347 | 221 | 63.7 |
| oleoresinous | 6.5 | 667 | 614 | 92.1 |
| polyurethane | 2.5 | 46 | 56 | 122 |
| polyurethane-nylon | 6.5 | 21.5 | 23.5 | 109 |

As may be seen from Table II, time to first coil failure was significantly higher for composition 7 and 12 than for any other compositions. It will be noted from Table I that composition 6 contains propylene glycol, rather than dipropylene glycol, as called for by the invention. Composition 13 contains less than the amount of dipropylene glycol required by the invention.

Composition 12 had the highest average time to failure of all compositions tried, or 671 hours, with a standard deviation of 250 and a coefficient of variance $C_v$ of 37.3 percent. The coefficient of variance may be taken as an indication of the confidence in the value for average time to failure. A low $C_v$ indicates a high degree of confidence. Thus, while the oleoresinous composition had a high average time to failure, or 667 hours, the standard deviation of 614 and $C_v$ of 92.1 percent indicate a low degree of confidence in the result. This result is in large part due to the short time to first failure, which contributes to undue spread in the data points. Composition 7 had the third highest average time to failure, and the lowest $C_v$ or 36.2 percent. Thus, the compositions of the invention, 7 and 12, exhibited superior thermal aging characteristics.

The thermal aging results are depicted graphically in the FIGURE in which percent cumulative failure (number of samples which failed/total samples + 1 × 100) is plotted versus time to failure in hours for compositions 7 and 12, designated B and C, respectively, and for the three prior art compositions. As may be seen, the time to first coil failure was at least 80 hours for the inventive compositions, compared to only about 5 to 7 hours for the prior art compositions. While the oleoresinous composition exhibited high failure times for the last one-half of the sample lot, the large spread in the curve indicates low confidence in the average time to failure, as indicated above. Thus, the compositions of the invention exhibited superior thermal aging characteristics.

EXAMPLE 2

Continuity of the coatings B and C were measured using ASTM procedure D1670-76. Discontinuity defects were from zero to five per 100 feet of wire which is substantially below the maximum acceptable level of about 10 per 100 feet.

EXAMPLE 3

The elongation of the fully cured resins B and C were measured according to ASTMD 522 by forming 0.5 to 1 mil thick coatings of the above partially cured resin solutions onto blanks, fully curing the coatings at 200°C for 30 minutes and bending the resultant structure. The coatings exhibited greater than 30 percent elongation which is more than adequate for wire coating.

EXAMPLE 4

Dielectric breakdown was measured on the coated wire for compositions B and C and was found to be an average of 2,800 volts for B and 2,300 volts for C, which is substantially more than required for the magnet wire coatings contemplated.

What is claimed is:

1. An electric wire coated with a resin film which is the cured reaction product of the following components: trimellitic anhydride in the amount of 42.7 parts by weight, dipropylene glycol in the amount of 14.9 parts by weight, neopentyl glycol in the amount of 11.6 parts by weight, glycerol in the amount of 6.8 parts by weight and castor oil in the amount of 24 parts by weight.

2. An electric wire coated with a resin film which is the cured reaction product of the following components: trimellitic anhydride in the amount of from 41 to 44 parts by weight of the total weight of the resin, castor oil, in the amount of 20 to 26 parts by weight of the total weight of the resin, one or more short-chain diols containing hydroxyl groups and containing less than 10 carbon atoms per molecule, said diols including at least 50 percent by weight of dipropylene glycol, and being present in the amount of from 28 to 31 parts by weight of the total weight of the resin, and glycerol in the amount of 6.3 to 7.2 parts by weight of the total weight of the resin, said components being combined within said parts by weight ranges to give a ratio of total functional OH groups to total functional COOH groups of from 1.05:1 to 1.15:1.

3. The article of claim 2 in which dipropylene glycol is the only diol entering into the reaction product.

* * * * *